US008271044B2

(12) United States Patent
Joles et al.

(10) Patent No.: US 8,271,044 B2
(45) Date of Patent: Sep. 18, 2012

(54) SYSTEM AND METHOD FOR INSTALLATION OF A WIRELESS CONNECTION

(75) Inventors: Jonathan David Joles, Saginaw, MI (US); Leroy Albert Koglin, Jr., Bad Axe, MI (US); Scott Alan Zimmer, Frankenmuth, MI (US)

(73) Assignee: Air Advantage, Frankenmuth, MI (US)

( * ) Notice: Subject to any disclaimer, the term of this patent is extended or adjusted under 35 U.S.C. 154(b) by 1184 days.

(21) Appl. No.: 11/943,631

(22) Filed: Nov. 21, 2007

(65) Prior Publication Data
US 2009/0131111 A1 May 21, 2009

(51) Int. Cl.
*H04W 72/00* (2009.01)
(52) U.S. Cl. ............... 455/562.1; 455/411; 455/418; 709/220
(58) Field of Classification Search .............. 455/411, 455/418, 420, 562.1, 436–444; 709/220–222; 370/328, 338
See application file for complete search history.

(56) References Cited

U.S. PATENT DOCUMENTS

| 5,760,739 | A | 6/1998 | Pauli |
| 5,915,020 | A | 6/1999 | Tilford et al. |
| 5,952,966 | A | 9/1999 | Smith |
| 6,049,306 | A | 4/2000 | Amarillas |
| 6,463,089 | B1 | 10/2002 | Chauncey et al. |
| 6,501,423 | B2 | 12/2002 | Kelly et al. |
| 6,836,675 | B2 | 12/2004 | Zhang |
| 7,010,002 | B2 | 3/2006 | Chow et al. |
| 7,012,899 | B1 * | 3/2006 | Hagler et al. ............ 370/252 |
| 2002/0164954 | A1 * | 11/2002 | Jalali ........................ 455/67.1 |
| 2004/0033780 | A1 | 2/2004 | Kelly |
| 2004/0114553 | A1 * | 6/2004 | Jiang et al. ............... 370/328 |
| 2005/0099891 | A1 * | 5/2005 | Protoolis et al. .......... 367/118 |
| 2005/0164664 | A1 | 7/2005 | DiFonzo et al. |
| 2005/0174961 | A1 * | 8/2005 | Hrastar ..................... 370/328 |
| 2006/0109825 | A1 * | 5/2006 | Abdel-Kader et al. .... 370/338 |
| 2006/0252405 | A1 | 11/2006 | Matz et al. |
| 2007/0027964 | A1 * | 2/2007 | Herrod et al. ............. 709/220 |

FOREIGN PATENT DOCUMENTS
GB 2 408 653 A 6/2005

OTHER PUBLICATIONS

Installing a Galaxy 19 dish Antenna using the Super Buddy http://www.youtube.com/watch?v=zR8NZyuDXWk Sep. 15, 2007.*
Hughes Network Systems DirecWay Remote Terminal Installation Guide Jun. 3, 2005 http://www.stratosglobal.com/~/media/SGlobal/Documents/factsheets/hughesNet/hughesNet_userguide_HN7X00Installation.ashx.*
Receiver User Guide Duo 322, 2004 http://www.dishnetwork.com/supportsection/manuals.*
Applied Instruments, Installing Dish 1000 with Super Buddy meter, Oct. 27, 2006. http://www.appliedin.com/www/assets/products/SuperBuddy/downloads/SuperBuddy_Dish1000.pdf.*

* cited by examiner

Primary Examiner — Kamran Afshar
Assistant Examiner — Marisol Fahnert
(74) Attorney, Agent, or Firm — Robert L. Stearns; Dickinson Wright, PLLC

(57) ABSTRACT

A system and method for installing wireless broadband service at a customer location. A temporary connection between a customer modem and internet service provider network is established such that final configuration of the customer modem can be completed remotely, thus eliminating the need for highly skilled installers. Further, the system and method of the present invention precludes the completion of the installation process in the event that the signal falls outside of the acceptable range.

20 Claims, 3 Drawing Sheets

SYSTEM AND METHOD FOR INSTALLATION OF A WIRELESS CONNECTION

BACKGROUND OF THE INVENTION

1. Technical Field

The present invention relates to a system and method for installing wireless broadband service at a customer location, including properly configuring the customer hardware and ensuring adequate connectivity.

2. Discussion

Wireless telecommunication systems are becoming, if they are not already, ubiquitous. Such systems, once reserved for only the most secure locations and high-tech devices, are now frequently encountered at libraries, office buildings, hotels, hospitals and even coffee shops and accessed by common laptop computers, or even inexpensive handheld devices. It is clear that wireless broadband connectivity will be a requisite for all but the most simplistic electronic devices in the near future.

Presently, the predominant methods of providing internet connectivity to a computer is through cable modem, Digital Subscriber Line ("DSL") or T1 or similar connection. Each of these systems requires a network provider to connect a user device (e.g., modem) to a network through a physical connection (copper wire, optical fiber, etc.). While this business model works adequately in urban and semi-urban areas, in rural locales with lower population densities the network provider may make a business decision that the high fixed cost of providing such a physical connection to a subscriber location would not be justified in light of the expected revenue that would be generated by the subscriber. Thus, many potential subscribers in rural areas are precluded from obtaining a low cost, broadband connection the internet.

Companies have addressed this problem by developing an antenna-to-antenna telecommunication system that utilizes radio waves to provide connectivity between a customer location and an internet access point (e.g., at a cell tower) that can be hardwired to the internet. The benefits of such systems include the ability to allow many users to connect to one main internet access point over relatively long distances. In this manner, the fixed cost of providing hardwired connectivity to the internet may be distributed among many potential subscribers.

The wireless broadband systems discussed above require that a subscriber have an antenna installed that is then hardwired to a modem connected to a computer. The installation process of this antenna is fairly complex and requires an installer with not only specialized technical computer knowledge but also a proficiency in manual labor to physically mount the antenna in position. A similar antenna installation process is described in U.S. Pat. No. 6,836,675, which relates to a method for aiming and adjusting a microwave antenna.

Typically, an internet service provider uses two installers, one that is computer savvy to configure the modem for connectivity as well as security purposes, and another to provide the manual labor. Because two installers must be present, one of which who has specialized technical training, the installation process is more expensive than if one, relatively unsophisticated installer could be used. The expense is further exacerbated by the fact that the two installers must often take turns to complete their respective tasks, e.g., the technical installer must be present while the antenna is mounted to a structure but cannot begin his installation tasks until such mounting is complete, or the manual labor installer must wait for the technical installer to ensure adequate connectivity before departing in the event that the antenna must be moved to a more suitable position.

Therefore, there is a need for a new and improved method and system for installing a wireless broadband system that provides for simplified installation and configuration such that one relatively unskilled installer may be used to install the wireless antenna.

SUMMARY OF THE INVENTION

In view of the above, the described features of the present invention generally relate to a method for a wireless communication system. The method includes the steps of mounting an antenna, selecting a remote transceiver, automatically beginning configuration of a modem operably coupled to the antenna based on the selected remote transceiver and establishing a first connection between the modem, antenna and the remote transceiver. Further, the method includes monitoring a signal strength and noise level of the first connection, comparing the signal strength to a signal strength threshold, and comparing the noise level to a noise level threshold. If the signal strength is less than the signal strength threshold or the noise level is greater than the noise level threshold, the method includes the step of automatically preventing completion of the configuration of the modem. Alternatively, if the signal strength is greater than the signal strength threshold and the noise level is less than the noise level threshold, the method includes the step of completing configuration of the modem and establishing a second connection between the modem, antenna and the remote transceiver.

Further, the present invention relates to a wireless communication system. The system includes an antenna, a remote transceiver, a modem operably coupled to the antenna, and a computer operably coupled to the antenna and the modem. The computer includes a first software routine for automatically beginning configuration of the modem based on parameters of the remote transceiver, and a second software routine for establishing a first connection between the modem, antenna and the remote transceiver. The computer further includes a third software routine for monitoring a signal strength and noise level of the first connection, comparing the signal strength to a signal strength threshold, and comparing the noise level to a noise level threshold. Additionally, the computer includes a fourth software routine that automatically prevents completion of the configuration of said modem if the signal strength is less than the signal strength threshold or the noise level is greater than the noise level threshold. The fourth software routine completes configuration of the modem and establishes a second connection between the modem, antenna and the remote transceiver if the signal strength is greater than the signal strength threshold and the noise level is less than the noise level threshold.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION

The present invention relates to an automated software product and process for installing wireless broadband service at a customer location, including properly configuring the customer hardware and ensuring adequate connectivity. This invention comprises an improvement over prior art wireless broadband installation processes, as described above, because one relatively unskilled installer may complete installation and configuration of the hardware utilized in providing such broadband service.

Figure 1:
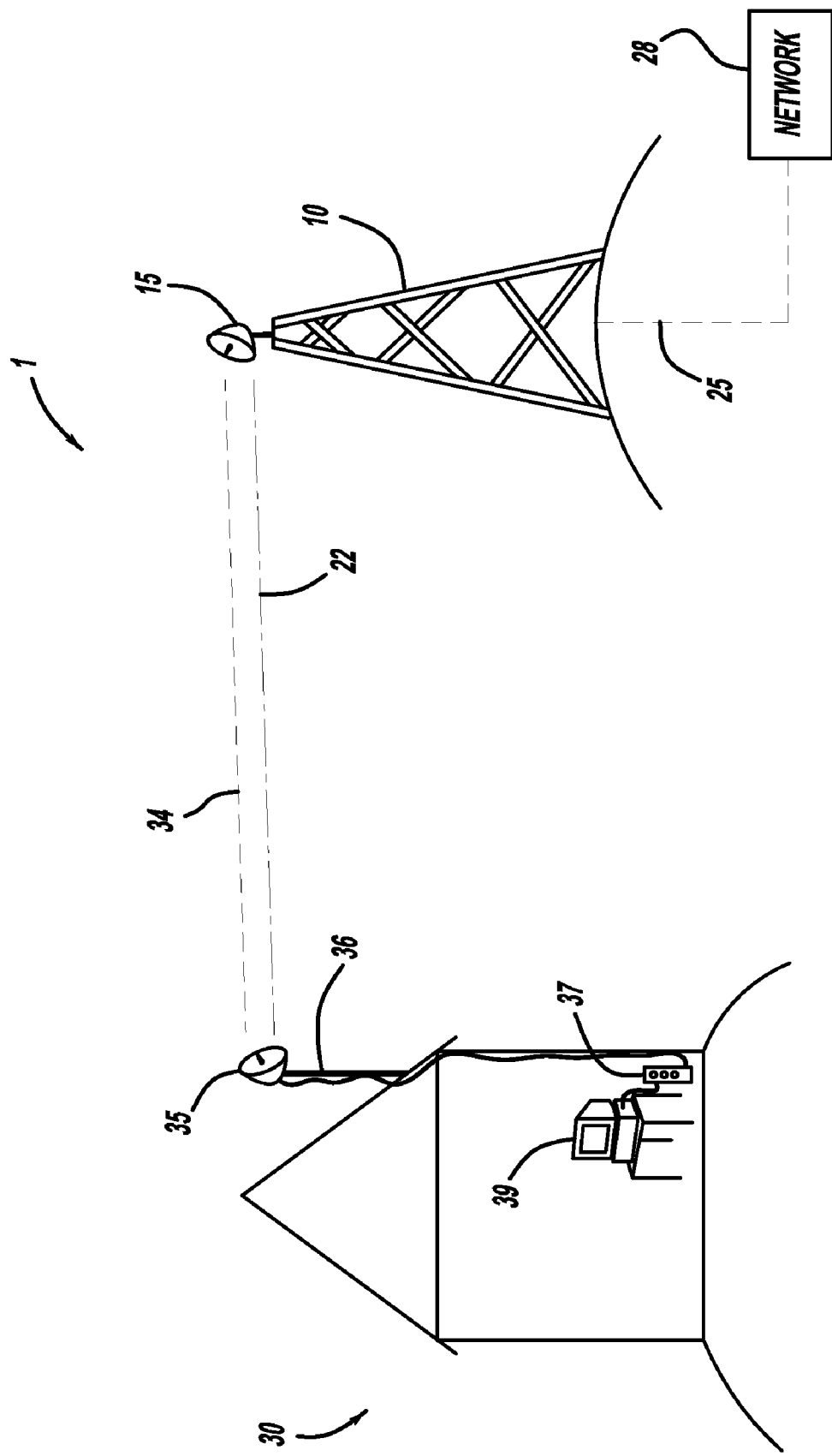
FIG. 1 is an illustration of a conventional wireless broadband service connection.

A prior art wireless broadband service connection 1 is illustrated in FIG. 1. A cell tower 10 or similar antenna mounting site is utilized to provide a location for mounting a two-way antenna 15 or other type of remote transceiver. In one embodiment, a directional two-way radio antenna 15 is connected to an internet service provider's network 20 by means of connection 25. The two-way antenna 15 is configured to transmit information from network 20 by means of radio signal 22 to customer site 30. Customer site 30 includes an installed two-way antenna 35 that receives tower signal 22 and transmits customer signal 34 to tower antenna 15. This customer antenna 35 is secured in a position that provides for reliable communication with cell tower antenna 15. As discussed more fully below, the factors associated with determining the proper position for antenna 35 include the received strength and noise level (or signal-to-noise ratio) of signal 22. A modem 37 is hardwired to antenna 35 by connection 36, and further connected to customer computer 39. The modem 37 provides the port through which computer 39 interacts with network 20.

In order to establish communication between customer site 30 and network 20, prior art installers had to (1) install the customer antenna 35, (2) manually select the appropriate tower 10, (3) manually program the modem 37 to accept the appropriate frequency and IP range for the selected tower, (4) manually monitor signal 22 for determination of a reliable connection, (5) if necessary, adjust customer antenna 35 to provide a more reliable connection and repeat steps 4 and 5 until an adequate signal strength and quality have been obtained, (6) once obtaining a reliable connection, secure the position of customer antenna 35 in the desired position, and (7) manually configure modem 37 to allow access to the internet service provider's network 20 for security and connectivity purposes.

In the course of such prior art installation, the installer would be required to know or determine (e.g., by means of a reference chart) a large number of technical details of the internet network provider's system, including many sensitive security details. For example, to complete step (3) above, the installer would be required to know the type of tower antenna 15 and the appropriate frequency and IP range for that type of antenna 15. Further, and more importantly from a security standpoint, to complete step 7 the installer must be provided with the appropriate access codes for the modem to be programmed to access the network. In addition to these internet service provider specific details, the installer must know the technical details of how to manually configure the modem with the correct access codes to achieve a connection. Based on the high level of training and information required to complete such installation, internet service providers often utilized two different installers; one to provide for the manual installation of the customer antenna 35 and the other to configure the modem 37 for connection to the network.

The present invention relates to an improved method and system for the installation of a wireless broadband connection 1. In one embodiment, the invention comprises a software program running on the installer's laptop (or otherwise portable) computer. The installer connects his or her laptop to the customer's modem 37 and initiates the installation program. The installer then mounts the customer antenna 35, as described above. As shown in FIGS. 2A to 2D, the installation program displays to the installer the numbered steps of the installation process. In the first step, the installer chooses the appropriate tower 10 from the list of towers presented (see FIG. 2A). In one embodiment, the installer will be provided with a suggested tower or towers from the internet service provider. In another embodiment, the installer will be provided with a guide that can be referenced to determine the appropriate tower(s). In yet another embodiment, a GPS unit or similar location determination device can be utilized by the installer's computer to determine the customer location and, based on this information, the appropriate tower(s).

Figure 2B:
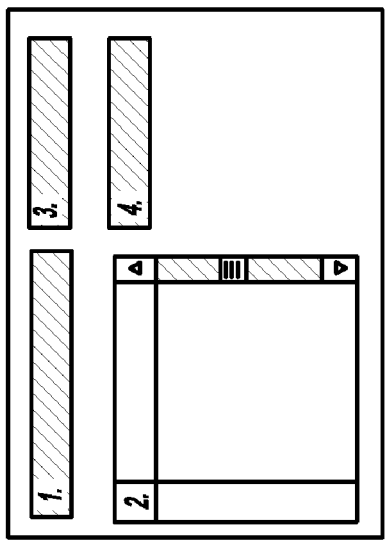
FIGS. 2A-2D are a plurality of screenshots from a computer program that performs an installation method according to one embodiment of the present invention.
Figure 2D:
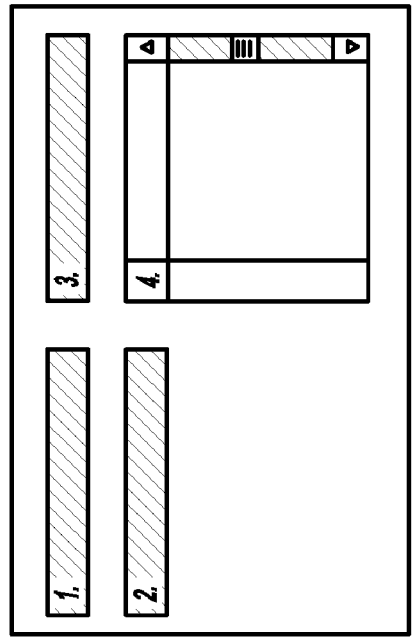
Figure 2A:
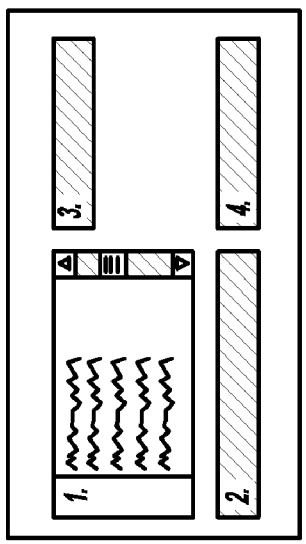
Figure 2C:
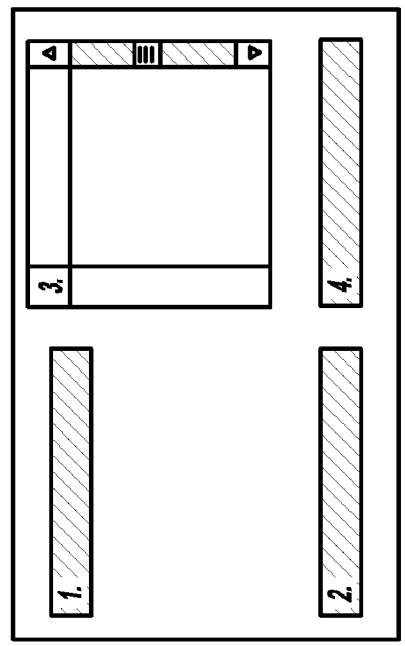

In the second step of the process, the computer program confirms the selected tower and automatically configures the customer's modem 37 to receive the correct frequency and IP range for the selected tower. A screen shot of the installer's computer during this step is illustrated in FIG. 2B. Once the configuration is completed by the program, the installer must initiate the third step of the process, which comprises the signal verification check (see FIG. 2C). During this step, the program monitors the signal 22 received by customer antenna 35 (and, ultimately, modem 37) to ensure that the signal 22 falls within the acceptable operating range. The monitored parameters of this signal 22 check include strength of signal and noise level, however additional parameters may also be monitored (e.g., signal-to-noise ratio). The program monitors the signal parameters for compliance with the required thresholds and automatically prohibits the installer from proceeding with the installation process if these signal parameters are not acceptable. In one embodiment, this prohibition step comprises locking out the installer from the computer program unless and until the signal verification check is successfully completed. In another embodiment, the prohibition step comprises requiring the installer to select an option to complete the installation process, wherein the option is not presented unless and until the signal verification check is successfully completed. If the signal parameters are not acceptable, the installer must then physically adjust the position of the customer antenna 35 to achieve a better signal from the tower antenna 15. Then, the signal verification check may be reinitiated to ensure adequate signal strength and quality. If the signal verification check is not successfully performed, the installer may reinitiate the first step of the installation process and choose a different tower 10 with which to connect (e.g., if the installer determines that a reliable connection with the originally selected tower 10 is difficult or impossible to obtain).

Upon successful completion of the signal verification check, the fourth and final step of the installation may be completed by the installer. As stated above, in one embodiment (illustrated in FIG. 2D) the installer must direct the computer program to begin the final step by clicking a button on the graphical user interface of the computer that is only selectable after successful completion of the signal verification check. The fourth step completes the installation process by automatically configuring the modem 37 to a temporary setup configuration. Upon selection by the installer, the computer program automatically loads the modem with the temporary setup settings. In one embodiment, the base configuration of the modem 37 must be modified before installation to allow the computer program to configure the modem 37 with these temporary setup settings. The modem 37 then is automatically connected to the internet service provider's network 20 with these temporary settings. The temporary settings may include, for example, a predetermined IP address and password configuration. These temporary settings are preloaded into the computer program and known only to the internet service provider and its most trusted employees. In this manner, and in contrast to the prior art installation process described above, the disclosure of these highly sensitive settings to installers (the number of which can be great) can be eliminated and the number of employees to whom they are disclosed can be limited.

The temporary settings allow one of the trusted service representatives remote from the customer location (e.g., at the internet service provider location) to connect with the customer modem 37 over the broadband connection 1. The temporary settings allow the remote service representative to provide the permanent configuration settings (e.g., the customer's final IP address, initial password setting and unique identifier linking the modem 37 to the customer) to the modem 37 over the network, rather than being done manually. In this manner, not only is the security of the temporary settings protected, but also the security of the final settings of the customers modem 37. Furthermore, with this invention the internet service provider may retain greater control of the unique identifiers and IP addresses because the delay between when the final settings are selected and when the modem is configured with such settings is reduced.

Figure 3:
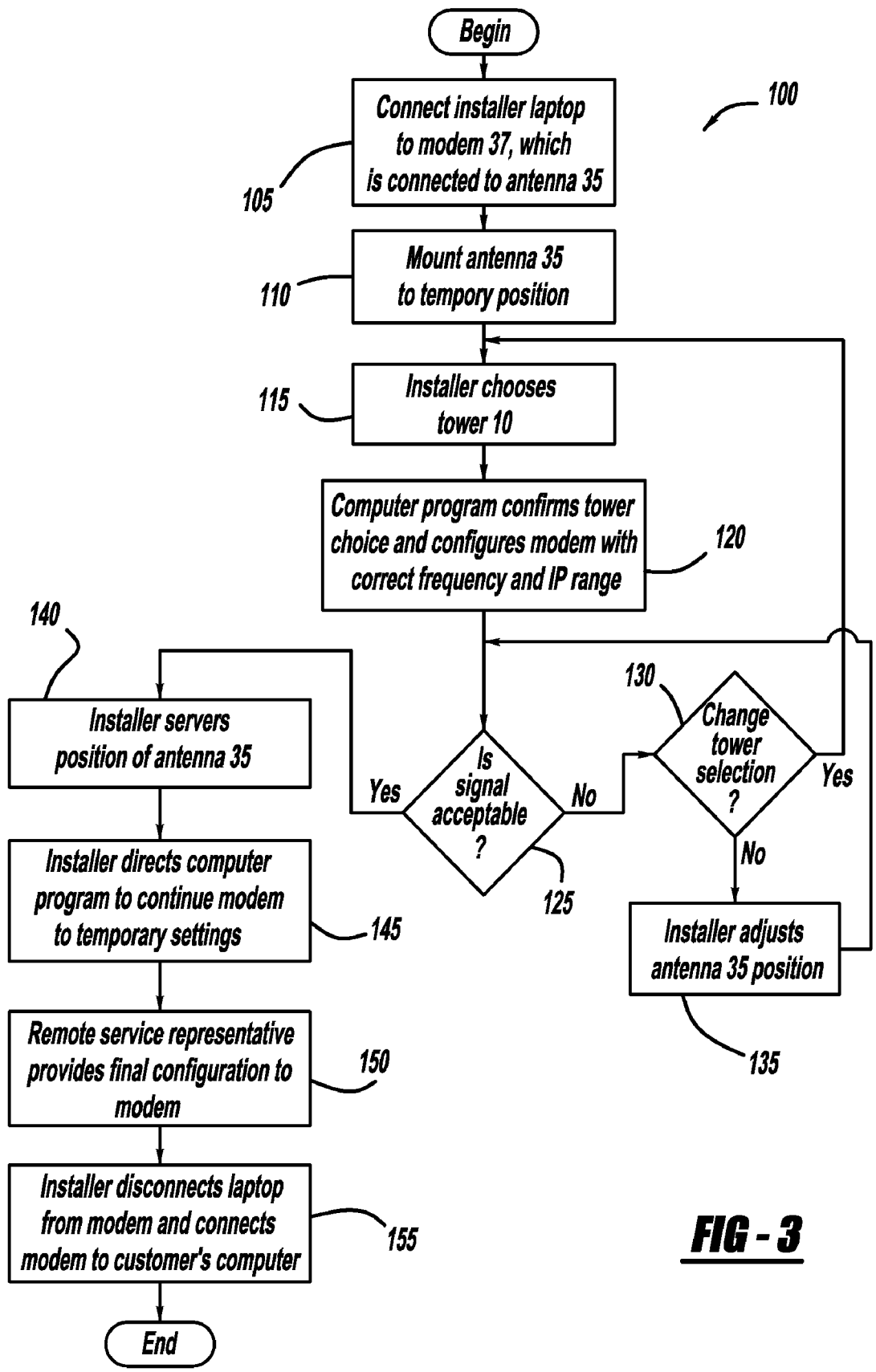
FIG. 3 is a flowchart illustrating the steps of an installation method according to one embodiment of the present invention.

A flow-chart describing the steps of the installation method 100 according to one embodiment of the present invention is illustrated in FIG. 3. The method 100 begins with the installer connecting his or her laptop to the customer modem 37, which is connected to the customer antenna 35 (see step 105). At step 110, the installer mounts the antenna in an initial position. The installer then loads the computer program of the present invention and chooses the desired tower 10 for the customer location at step 115. In step 120 the computer program confirms the selected tower 10 and automatically configures the modem with the correct frequency and IP address range for the selected tower 10. At step 125, the computer program monitors signal parameters and determines whether the strength and quality of signal 22 is acceptable. If the signal is not acceptable, the installer then must determine at step 130 whether to select a different tower 10 with which to connect. If the installer wishes to change towers 10, the method returns to step 115. If the installer wishes to proceed with the previously selected tower 10, at step 135 the installer adjusts the position of the antenna 35 and returns to step 125 to determine whether the signal 22 is acceptable. The present invention will automatically prohibit the installer from continuing with the installation process if the signal is unacceptable.

Once the signal is determined to be acceptable by the computer program at step 125, the method proceeds to step 140 during which the installer secures the antenna 35 to its final position. At step 145, the installer directs the computer program to complete the installation process. The computer program then configures the modem 37 to the temporary settings that are described more fully above. The temporary settings allow a service representative to remotely connect with the modem 37 over connection 1 and complete the final configuration settings of the modem 37 (see step 150). Once the final settings of modem 37 have been configured, at step 155 the installer disconnects the laptop from the modem 37 and connects the customer's computer to the modem 37.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of installing a wireless broadband service at a customer location, comprising:
    mounting an antenna,
    selecting a remote transceiver,
    automatically beginning configuration of a modem operably coupled to said antenna based on said selected remote transceiver,
    establishing a first connection between said modem, antenna and said remote transceiver,
    monitoring a signal strength and noise level of said first connection,
    comparing said signal strength to a signal strength threshold,
    comparing said noise level to a noise level threshold,
    if said signal strength is less than said signal strength threshold or said noise level is greater than said noise level threshold, automatically preventing completion of said configuration of said modem, and
    if said signal strength is greater than said signal strength threshold and said noise level is less than said noise level threshold, completing said configuration of said modem and establishing a second connection between said modem, said antenna and said remote transceiver,
    wherein completing said configuration of said modem, comprises:
        loading said modem with temporary configuration settings;
        providing the temporary configuration settings to a remote representative; and
        receiving permanent configuration settings that replace the temporary configuration settings.

2. The method of claim 1, wherein said step of automatically preventing completion of said configuration of said modem comprises locking out an installer from completing said configuration of said modem.

3. The method of claim 1, wherein the step of completing configuration of said modem comprises remotely accessing said modem over said first connection.

4. The method of claim 3, wherein said step of automatically preventing completion of said configuration of said modem comprises locking out an installer from completing said configuration of said modem.

5. The method of claim 4, wherein said remote transceiver comprises a directional radio antenna.

6. The method of claim 1, wherein said remote transceiver comprises a directional radio antenna.

7. The method of claim 6, wherein said step of automatically preventing completion of said configuration of said modem comprises locking out an installer from completing said configuration of said modem.

8. The method of claim 1, wherein said noise level comprises a signal-to-noise ratio.

9. The method of claim 8, wherein the step of completing configuration of said modem comprises remotely accessing said modem over said first connection.

10. The method of claim 9, wherein said step of automatically preventing completion of said configuration of said modem comprises locking out an installer from completing said configuration of said modem.

11. A wireless broadband service installation system, comprising:

an antenna, a remote transceiver, a modem operably coupled to said antenna, and a computer operably coupled to said antenna and said modem comprising:

a first software routine for automatically beginning configuration of said modem based on parameters of said remote transceiver, a second software routine for establishing a first connection between said modem, antenna and said remote transceiver, a third software routine for monitoring a signal strength and noise level of said first connection, comparing said signal strength to a signal strength threshold, and comparing said noise level to a noise level threshold, and a fourth software routine for:

(i) if said signal strength is less than said signal strength threshold or said noise level is greater than said noise level threshold, automatically preventing completion of said configuration of said modem, and (ii) if said signal strength is greater than said signal strength threshold and said noise level is less than said noise level threshold, completing said configuration of said modem and establishing a second connection between said modem, antenna and said remote transceiver, wherein the fourth software routine provides for:

loading said modem with temporary configuration settings;

providing the temporary configuration settings to a remote representative; and receiving permanent configuration settings that replace the temporary configuration settings.

12. The system of claim 11, wherein said step of automatically preventing completion of said configuration of said modem comprises locking out an installer from completing said configuration of said modem.

13. The system of claim 11, wherein the step of completing configuration of said modem comprises remotely accessing said modem over said first connection.

14. The system of claim 13, wherein said step of automatically preventing completion of said configuration of said modem comprises locking out an installer from completing said configuration of said modem.

15. The system of claim 14, wherein said remote transceiver comprises a directional radio antenna.

16. The system of claim 11, wherein said remote transceiver comprises a directional radio antenna.

17. The system of claim 16, wherein said step of automatically preventing completion of said configuration of said modem comprises locking out an installer from completing said configuration of said modem.

18. The system of claim 11, wherein said noise level comprises a signal-to-noise ratio.

19. The system of claim 18, wherein completion of the configuration of said modem comprises remotely accessing said modem over said first connection.

20. The system of claim 19, wherein automatic prevention of completion of said configuration of said modem comprises locking out an installer from completing said configuration of said modem.

\* \* \* \* \*